US009800626B2

(12) United States Patent
Le Rouzic et al.

(10) Patent No.: US 9,800,626 B2
(45) Date of Patent: Oct. 24, 2017

(54) SELECTING REFRESH PERIODS IN AN IP NETWORK

(71) Applicant: ORANGE, Paris (FR)

(72) Inventors: Jean-Claude Le Rouzic, Trebeurden (FR); Guy Loaec, Ploudaniel (FR)

(73) Assignee: ORANGE, Paris (FR)

( * ) Notice: Subject to any disclaimer, the term of this patent is extended or adjusted under 35 U.S.C. 154(b) by 195 days.

(21) Appl. No.: 14/442,641

(22) PCT Filed: Nov. 13, 2013

(86) PCT No.: PCT/FR2013/052718
§ 371 (c)(1),
(2) Date: May 13, 2015

(87) PCT Pub. No.: WO2014/076410
PCT Pub. Date: May 22, 2014

(65) Prior Publication Data
US 2016/0119386 A1  Apr. 28, 2016

(30) Foreign Application Priority Data

Nov. 13, 2012  (FR) .................................. 12 60795

(51) Int. Cl.
*H04L 29/06* (2006.01)
*H04W 12/06* (2009.01)

(52) U.S. Cl.
CPC ........ *H04L 65/1073* (2013.01); *H04L 63/126* (2013.01); *H04L 65/104* (2013.01);
(Continued)

(58) Field of Classification Search
CPC ............... H04L 63/126; H04L 65/1006; H04L 65/1016; H04L 65/104; H04L 65/105; H04L 65/1073; H04L 67/42; H04W 12/06
(Continued)

(56) References Cited

U.S. PATENT DOCUMENTS 8,806,601 B2 * 8/2014 Sheehan ............... G06F 21/335
709/227
2008/0049724 A1 * 2/2008 Tsujino ............... H04L 65/1006
370/352
(Continued)

FOREIGN PATENT DOCUMENTS

WO  20060072817 A1  7/2006

OTHER PUBLICATIONS

MAHY CISCO Systems R et al: "A Message Summary and Message Waiting Indication Event Package for the Session Initiation Protocol (SIP); rfc3842.txt", Aug. 1, 2004, 1 aout 2004, (Aug. 1, 2004), XP015009620.
(Continued)

*Primary Examiner* — Alina N Boutah
(74) *Attorney, Agent, or Firm* — David D. Brush; Westman, Champlin & Koehler, P.A.

(57) ABSTRACT

A registration server in an IP network is provided. The server is configured to act, after receiving a request for an initial registration or for refreshing a registration with the IP network, or for an initial subscription or for refreshing a subscription to a given service made available on the IP network, to select for the client device sending the request a value for the corresponding refresh period. The server is also configured to select the value as a function, at least, of the type of authentication used by the client device for authenticating itself with the IP network.

8 Claims, 1 Drawing Sheet

(52) U.S. Cl.
CPC ........ *H04L 65/105* (2013.01); *H04L 65/1006* (2013.01); *H04L 65/1016* (2013.01); *H04L 67/42* (2013.01); *H04W 12/06* (2013.01)

(58) Field of Classification Search
USPC ........................................................ 709/229
See application file for complete search history.

(56) References Cited

U.S. PATENT DOCUMENTS

| | | | | |
|---|---|---|---|---|
| 2008/0256177 | A1* | 10/2008 | Boberg | H04L 67/1095 709/203 |
| 2009/0296566 | A1* | 12/2009 | Yasrebl | H04L 41/5087 370/221 |
| 2009/0296567 | A1* | 12/2009 | Yasrebi | H04L 29/12028 370/221 |
| 2010/0048176 | A1* | 2/2010 | Osborn | H01Q 1/246 455/411 |
| 2010/0217985 | A1* | 8/2010 | Fahrny | G06F 21/10 713/169 |
| 2011/0019665 | A1* | 1/2011 | Le Rouzic | H04L 65/1069 370/352 |
| 2011/0083014 | A1* | 4/2011 | Lim | H04L 29/12764 713/168 |
| 2012/0127851 | A1* | 5/2012 | Le Rouzic | H04L 69/28 370/216 |
| 2012/0163184 | A1* | 6/2012 | Choi | H04L 65/1016 370/241 |
| 2014/0143413 | A1* | 5/2014 | Fang | H04L 65/1016 709/224 |

OTHER PUBLICATIONS

International Search Report and Written Opinion dated Jan. 30, 2014 for corresponding International Application No. PCT/FR2013/052718, filed Nov. 13, 2013.

English translation of the Written Opinion dated May 13, 2015 for corresponding International Application No. PCT/FR2013/052718, filed Nov. 13, 2013.

* cited by examiner

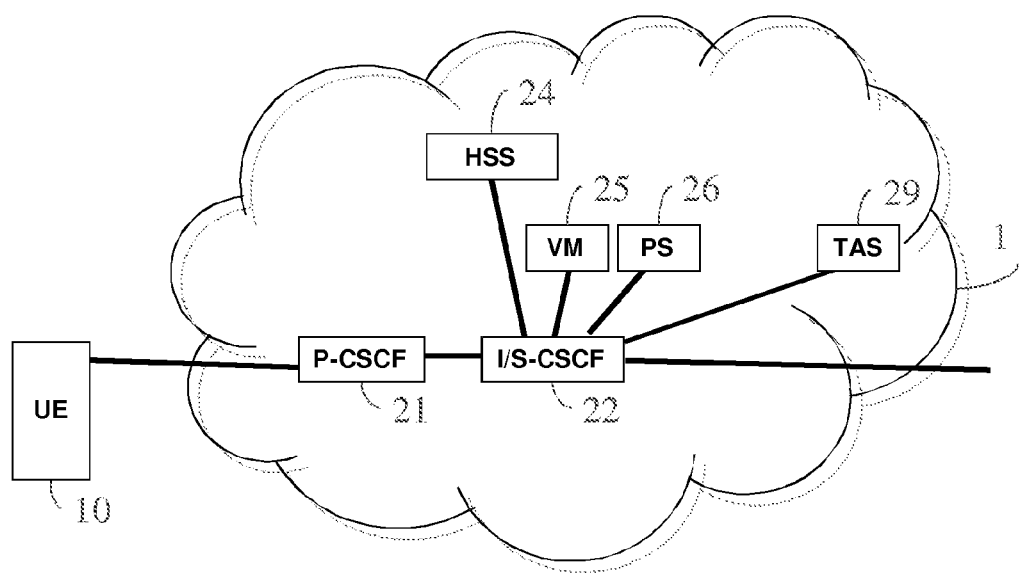

SELECTING REFRESH PERIODS IN AN IP NETWORK

CROSS-REFERENCE TO RELATED APPLICATIONS

This Application is a Section 371 National Stage Application of International Application No. PCT/FR2013/052718, filed Nov. 13, 2013, the content of which is incorporated herein by reference in its entirety, and published as WO 2014/076410 on May 22, 2014, not in English.

FIELD OF THE DISCLOSURE

The present invention relates to communications networks of the Internet protocol (IP) type, and in particular those IP networks that are suitable for implementing advanced session control protocols. IP networks enable conversation data to be conveyed in the context of services such as voice over IP (VoIP), "content sharing", or "instant messaging".

More particularly, the present invention relates to the means put into place in an IP network with respect to a client device (also referred to for simplicity as a "terminal") for setting its refresh period with the core network.

BACKGROUND OF THE DISCLOSURE

It is said that a client device (also known as "user equipment") "belongs" to the network of a given operator when the user of the client device possesses an account with that operator, and this applies regardless of which access network is actually used by the client device for connecting to the network of the operator. By way of example, such a client device may be a fixed or mobile terminal, or a residential gateway, or it may be a gateway in a business, or indeed a voice gateway of a network operator such as a digital subscriber line access multiplexer using session initiation protocol (DSLAM-SIP); i.e. a device that collects digital subscriber line (DSL) data traffic passing via some number of telephone lines.

Conventional advanced session control protocols such as SIP use so-called "signaling" messages, which are messages enabling a terminal to request a connection with another terminal, or indeed messages indicating that a telephone line is busy, or indicating that some particular telephone is connected to the network and can be reached in such and such a manner.

The SIP was defined by the Internet engineering task force (IETF) in Document RFC 3261. This protocol makes it possible to set up, modify, and terminate multimedia sessions in a network using IP. SIP has subsequently been extended, in particular in Document RFC 3265. This extension serves to make event notification procedures possible.

SIP is used in particular in infrastructures of the IP multimedia system (IMS) type. IMS was defined by the standards Organizations Third generation partnership project (3GPP) and Telecommunications and Internet converged services and protocols for advancing networking (TISPAN). It is a network architecture that was introduced by 3GPP for mobile networks that has subsequently been taken on by TISPAN for fixed networks. This architecture enables multimedia sessions to be set up dynamically and controlled between two clients, and also enables resources to be reserved in the network transporting the multimedia streams. By means of this architecture, network operators can conveniently implement a management policy, can provide a predetermined level of quality of service (QoS), and can calculate how much to bill clients. At present, IMS gives access to services of the telephone, videophone, presence, and instant messaging types, and it also manages interaction between them.

When a user seeks to benefit from services made available by an IMS network, the user sends signaling messages to the network that may include in particular various types of request.

Firstly, a user's client device needs to register with the network (apart from certain exceptions such as some emergency calls). When the network is incapable of linking the registration with an earlier registration (e.g. as a result of a network breakdown, or after the terminal has been switched off for a duration longer than a predetermined value), the registration is considered as being an initial registration. After an initial registration, the user's client device must periodically send a request to the network in order to confirm that it seeks to maintain its registration; the registration is maintained only for a predetermined duration that is referred to herein as the "registration refresh period" (often labeled "Expires" in the technical literature); by way of example, above-mentioned Document RFC 3261 recommends a registration refresh period equal to 3600 seconds. In practice, it is the network that informs each registering client device of the value of the registration refresh period with which the client device needs to comply in order to benefit from the services made available by the network without interruption.

Thus, in order to be able to register client devices, IMS networks have one or more registration servers referred to as serving-call server control function (S-CSCF) servers that are suitable (among other functions) for managing the procedure of registering devices connected to the network.

In addition, these networks also have one or more servers known as "interrogating-call server control function" (I-ICSF) servers, which indeed are often physically combined with servers of the S-CSCF type in order to constitute servers referred to as I/S-CSCF servers, that at the time a client device registers interrogate a home subscriber server (HSS) in order to be able to select all S-CSCF server that possesses the characteristics that are necessarily required (and also where appropriate optionally required) for reaching the level of service to which the user has subscribed. Each HSS has a client database and is thus the equivalent in an IP network of a home location register (HLR) as used in networks of the global system for mobile communications (GSM) type. Each HSS contains the "profile" of some number of client devices of the network, which profile includes the registration states, authentication and location data, and the subscribed services of each client device.

After an S-CSCF server has been allocated to a user, each user can send a request to subscribe to certain services, with the subscription being valid for the current connection. The general principle is that a client device can subscribe to some particular technical service by using an appropriate request (SIP SUBSCRIBE). Thus, in the event of making a subscription to the state of a resource, event notifications (SIP NOTIFY) are sent to the client device whenever the state of the resource changes; for example, when the user of a terminal has a voice mailbox on the network, the terminal may subscribe to a message notification service, i.e. the terminal may request to be informed each time a message is recorded in the voice mailbox; likewise the user's terminal may request to be notified about its own registration state, and so on.

Initial subscription requests are sent either automatically immediately after the terminal is switched on or after an application installed on the terminal is started, or else following a user action on the interface of the terminal. For each subscription, the client device must begin by sending an initial request, and then periodically it must send a request for renewing the subscription (the subscription is said to be "refreshed").

For each subscription (whether an initial subscription or refreshing a subscription), the network informs the client device of the refresh period desired by the operator of the network for that subscription. According to Document RFC 3265, the maximum refresh period associated with a subscription to a particular service (or "event-package") made available by the network is defined by referring to the document that defines that particular technical service; for example, for the subscription to notification of new messages, Document RFC 3842 recommends a refresh period lying in the range a few hours to a few days (cf. "event-package message summary").

The subscription refresh period may be different for each type of subscribed service, and, a priori, it is also independent from the registration refresh period.

In this context, during normal operation of an SIP network, the network receives initial registration requests and initial subscription requests together with refresh requests for registration and for subscriptions, progressively as the users of the network connect thereto, initialize, and then renew their registrations and their subscriptions at the ends of the respective refresh periods provided for that purpose. Naturally, each IP network operator must make provision for sufficient processing capacity in the nodes of the network to be able to handle the corresponding frequency of requests, in particular as a function of the usual number of users of the network.

Selecting a value for the refresh period is a strategic decision, since this value determines the dimensioning of the equipment in the core network: if the refresh period is too short, then the extra cost in terms of dimensioning is high; if it is too long, then information about the presence of such and such a client device in the network is not very reliable.

Certain manufacturers provide for the possibility of adjusting the refresh period as a function of the technology of the access type (ADSL, xDSL, WiFi, WiMAX, GSM, LTE, and so on) used by the client device. Nevertheless, for any given type of access, there remains the question as to whether or not it is possible, still for the purpose of reducing as much as possible costs relating to registration and/or subscription traffic, to further refine the value(s) of one or more refresh periods as a function of other practical criteria.

SUMMARY

The present invention thus provides a registration server in an IP network, the server possessing means for acting, after receiving a request for an initial registration or for refreshing a registration with said IP network, or for an initial subscription or for refreshing a subscription to a given service made available on the IP network, to select for the client device sending the request a value for the corresponding refresh period. Said registration server is remarkable in that it further possesses means for selecting said value as a function, at least, of the type of authentication used by said client device for authenticating itself with the IP network.

The present invention thus proposes taking account of the type of authentication as discrimination means for selecting a refresh period for registration or for subscription. In the context of an IMS type network, said registration server may for example comprise an S-CSCF server.

By means of these provisions, a network operator can propose different refresh periods as a function of the level of confidence that can be given from a technical point of view to the type of authentication applied to the user of the client device. Certain types of authentication are considered as being very robust in this respect, such that fraud concerning illegal listening to communications (e.g. via a WiFi access point) is not possible; under such conditions, it is clear that the operator of the network can lengthen the refresh period without causing the users of the network to run any risk. In contrast, other authentication methods are not immune to ill-intentioned listening; unfortunately, such listening might enable a "pirate" to resort to "replay" attacks, for example, should the core network not apply all of the necessary verifications; under such circumstances, a relatively short registration period provides a degree of protection against such attacks, since by shortening the registration period it is possible to propose new authentication vectors to a client device frequently, every time the registration or the subscription is refreshed.

Thus, by taking account of the intrinsic security of the authentication method used, it is possible advantageously for a network operator to obtain the flexibility necessary for better dimensioning of that operator's core network, and also the corresponding access networks. Furthermore, the invention makes it possible to reduce battery use by mobile terminals by limiting, as much as possible, the frequency with which registration or subscription refresh requests need to be sent.

According to particular characteristics, said registration server further includes means for acting, when performing said selection of the value for the refresh period concerning the registration or the subscription to a given service, to take account also of the type of access used by said client device for accessing said IP network.

By means of these provisions, the value selected for the refresh period is made as pertinent as possible.

It should be observed that it is possible to implement the registration server in the context of software instructions and/or in the context of electronic circuits.

The invention thus also provides a computer program downloadable from a communications network and/or stored on a computer readable medium and/or executable by a microprocessor. The computer program is remarkable in that it includes instructions for managing the operation of a registration server as described briefly above, when executed on a computer.

The advantages offered by this computer program are essentially the same as those offered by said registration server.

In another aspect, the invention provides a database possessing means for acting in response to a request from a registration server of an IP network to provide to said registration server at least one value for the refresh period for the registration of a client device with said IP network and/or for a subscription by a client device to a given service made available by said IP network. Said database is remarkable in that when said request specifies a type of authentication used by said client device for authenticating itself with said IP network, said value provided by the database depends at least on said authentication type specified in the request.

It should be observed that this database may be physically incorporated in a registration server, or it may be located in a separate module (preferably consultable by the registration servers of the IP network).

By means of these provisions, the operator of the IP network has a dedicated location for storing information needed by the registration servers of the IP network in order to perform the means described briefly above. The database may conveniently be configured and updated by the operator of the IP network as a function of the operator's security policy and of the operator's capabilities in terms of dimensioning the network.

According to particular characteristics, said value provided by the database also depends on the type of access used by said client device for accessing said IP network, said access type also being specified in said request.

In addition, for registration and/or for a subscription to a given service, the database may advantageously provide different values for the refresh period associated with different modes, such as a minimum value and/or a default value and/or a maximum value.

In yet another aspect, the present invention provides a selection method for selecting a refresh period in an IP network, the method comprising the following steps:
a client device sending a request for an initial registration or for refreshing registration on said IP network or for an initial subscription or for refreshing a subscription to a given service available on the IP network; and
said client device receiving, in response to its request, a value for the corresponding refresh period. Said method is remarkable in that said value is a function, at least, of the type of authentication used by said client device for authenticating itself with the IP network.

According to particular characteristics, said value is also a function of the type of access used by said client device for accessing said IP network.

The advantages offered by this method of selecting a refresh period are essentially the same as those offered by said registration server.

BRIEF DESCRIPTION OF THE DRAWINGS

Other aspects and advantages of the invention appear on reading the following detailed description of particular embodiments given as non-limiting examples of which:

FIG. 1 is a diagram showing a system for delivering multimedia services and suitable for performing the invention.

DETAILED DESCRIPTION OF ILLUSTRATIVE EMBODIMENTS

Although the present invention relates to IP networks in general, consideration is given below by way of specific example to a network architecture of the IMS type, as described briefly below. This architecture is shown in FIG. 1.

The multimedia services made available by this IMS network 1 may comprise services such as telephony, video telephony, content sharing, presence, instant messaging, or television. These services are made available to the user of a client device (or "user equipment" (UE)) 10 belonging to the network 1, thereby enabling the client device 10 to exchange multimedia streams and session control signals in compliance with the SIP, e.g. with the client device (not shown) of a user belonging to an SIP network (not shown) connected to the network 1.

The client device 10 may be a fixed or mobile terminal, or a residential or business gateway, having SIP signaling means and possibly including means for playing back audio-visual content.

As shown in FIG. 1, the IMS network 1 comprises, in addition to IP transport infrastructure (not shown):
one or more I/S-CSCF call servers; an I/S-CSCF call server 22 serves in particular to manage the procedure for registering devices connected to the network 1; the I/S-CSCF server 22 also manages the routing of signaling between the client device 10 and the servers for voice messaging VMS 25, presence PS 26, and telephony TAS 29, and also routing to other terminals managed by the same IMS network, and the routing of signaling between this IMS network 1 and other networks (not shown);
one or more proxy-call server control function (P-CSCF) servers; the P-CSCF server 21 serves as a connection entity between the IMS core network and the access network used by the client device 10; thus, all SIP signaling exchanged between the client device 10 and the I/S-CSCF call server 22 passes via this P-CSCF server 21;
one or more database servers of the HSS type; an HSS 24 contains the profile of the user of the client device 10 in terms of authentication data, location, and subscribed services;
one or more voice message summary (VMS) servers 25; a VMS server 25 manages the subscription of the client device 10 to message deposit and/or consultation events relating to the client device 10, and it notifies the client device 10 when such events occur;
one or more presence servers (PS) 26; a PS 26 receives, stores, and distributes information relating to the presence of the user of the client device 10 on the network; and
one or more telephony application servers (TAS) 29; a TAS manages the telephone services to which the user of the terminal 10 has subscribed with that user's operator, such as number presentation or call forwarding.

The voice message servers 25, the presence servers 26, and the telephony application servers 29 are all examples of so-called application servers (AS).

Certain services, such as those of the VM server 25 and of the PS 26 rely on the terminal 10 subscribing to predetermined events.

In numerous IP networks, and in particular in IMS networks, every registration (whether initial or refreshing) of a terminal requires that terminal to be authenticated. Various types of authentication are commonly used.

For example, 3GPP defines (in Specification TS 33.203), the following types of authentication: authentication and key agreement (AKA); SIP digest with or without a security tunnel or "transport layer security" (TLS); network attachment sub-system (NASS)-IMS bundled; GPRS-IMS-bundled authentication (GIBA); and trusted node authentication (TNA).

Some of these types of authentication are considered to be very robust, insofar as they associate authentication with creating a security tunnel between the P-CSCF and the client device. This applies for example to IMS AKA (using a "IPsec" tunnel between the P-CSCF and the client device) and SIP digest on TLS (using a TLS tunnel between the P-CSCF and the client device). In contrast, other methods of authentication, e.g. such as GIBA, are not so robust.

The invention thus proposes selecting the value for the refresh period for registration and/or for a subscription to a given service as a function (at least) of the type of authentication, so as to be able to take account of the level of security that is specific to each authentication procedure.

One particular situation illustrating the practical advantage of the present invention is that of networks giving mobile terminals access to an IMS core network. In this respect, it should be recalled that core networks of conventional GSM and universal mobile telecommunications system (UMTS) architectures host circuit switches known as mobile switching centers (MSCs). These MSCs manage the communications link with the access network. They store the profile of the subscriber obtained from the HLR after the subscriber's client device has registered with the network, and they verify the network resources requested by the subscriber.

However, given its strategy of convergence towards a single core network for all types of access, the 3GPP has made provision for causing the service logic of mobile terminals served by MSCs to migrate to IMS. In such a configuration, the offer for mobile terminal services is hosted in IMS, but the mobile terminals continue to attach themselves to the mobile network, i.e. to an MSC server referred to as an IMS centralized services (ICS) server that registers the mobiles of which it is in charge in the IMS; that constitutes a kind of delegation of mobile terminal registration to a third entity as constituted by said ICS MSC. In order to perform such registration, the ICS MSC uses the above-mentioned TNA mode of authentication. It should be observed that this mode of authentication is somewhat peculiar insofar as it involves dialog between two pieces of equipment in the core network; under such conditions, the IMS network operator can naturally, and in complete security, select a refresh period that is long.

There follows a description of the steps of making an initial registration for a terminal 10 with IMS network 1 in a first implementation of the invention.

During a step E1, a terminal 10 sends, from a certain access network, a request to register with a P-CSCF server 21. This registration request includes a "header authorization" that provides information enabling the network 1 to determine the appropriate type of authentication. The structure of this authorization header may for example comply with the recommendations of IETF RFC 2617 (cf. in particular Sections 3.2.2 and 3.5), of the 3GPP specification TS 24.229 (cf. in particular Sections 5.1.1, 5.2.2, and 7.2A.2 in Version 11.5.0), or the 3GPP specification TS 33.203 (cf. in particular Appendices P.1, P.2 and P.3 in Version 12.1.0).

During a step E2, the P-CSCF server 21 relays the registration request to an I-CSCF server, while adding thereto, where appropriate (cf. for example IETF RFC 3455 or Section 7.2A.4 of the above-mentioned specification TS 24.229), information concerning the type of access used by the terminal 10 (e.g. in a "P-access-network-info" header). Thereafter, the I-CSCF server relays all of these elements to an S-CSCF registration server.

During a step E3, the S-CSCF registration server determines the appropriate type of authentication algorithm on the basis of said received elements, and where necessary on the basis of elements provided by an HSS 24 (in an MAA response to an MAR request sent by the S-CSCF registration server to request authentication information about this user from the HSS 24, such as the identifier and the password); the S-CSCF registration server can thus consult the HSS 24 about the final choice of algorithm when a plurality of algorithms are authorized by the operator for a given type of access. By way of example, it is possible at this point to apply the recommendations of above-mentioned Specifications TS 24.229 (cf. Section 5.4.1) and TS 33.203 (cf. Appendix P.4).

During a step E4, the S-CSCF registration server sends a consultation request to a database, said request specifying the type of authentication used by the terminal 10 for authenticating itself with the network 1, and optionally the type of access used by the terminal 10 for accessing the network 1.

Said database comprises a matrix table configured by the operator of the network and indexed by:
 the type of authentication, and optionally;
 other information such as the type of access used by the terminal (e.g. ADSL, xDSL, WiFi, WiMAX, GSM, or LTE).

As a result of this consultation, the S-CSCF obtains appropriate values as predetermined by the operator for the refresh period of the registration, with this preferably being associated with various different modes, namely a minimum value, a default value, and a maximum value.

During a step E5, the S-CSCF registration server sends one of said values for the registration refresh period as selected in this way to the P-CSCF server 21 in a response to the registration request received in step E2, these values being sent by using the "Expires" parameter of the "Contact" header. More exactly, this value transmitted to the P-CSCF server 21 is:
 the value by default if the terminal 10 has not requested a value for the registration refresh period;
 the maximum value if the terminal 10 requested a value longer than the maximum value in the registration request sent in step E1;
 the value requested by the terminal 10 if it lies in the range said minimum value to said maximum value; or
 said minimum value if the value requested by the terminal 10 is shorter than the minimum value. Optionally, the S-CSCF registration server may also transmit this value to application servers AS.

Finally, during a step E6, the P-CSCF server 21 transmits this value for the registration refresh period to the terminal 10 in a response message to the registration request.

In a second implementation, applicable in the above-mentioned context of access via a mobile network to an IMS core network, steps analogous to the steps of the above-described first implementation are performed, except that the P-CSCF server 21 is replaced by an ICS MSC server.

In general, the present invention may be performed within the nodes, e.g. the registration servers, of an IP network, by using software and/or hardware components.

The software components may be incorporated in a conventional network node management computer program. That is why, as mentioned above, the present invention also provides a computer system. The computer system includes in conventional manner a central processor unit using signals to control a memory, together with an input unit and an output unit. The computer system may also be used for executing a computer program including instructions for managing the operation of a registration server of the invention.

The invention also provides a computer program downloadable from a communications network and including instructions for managing the operation of a registration server of the invention when executed on a computer. The computer program may be stored on a computer readable medium and may be executable by a microprocessor.

The program may use any programming language and be in the form of source code, object code, or code intermediate between source code and object code, such as in a partially compiled form, or in any other desirable form.

The invention also provides a data medium that may be non-removable, or partially or totally removable, that is computer readable and that includes instructions of a computer program as mentioned above.

The data medium may be any entity or device capable of storing the program. For example, the medium may comprise storage means such as a read only memory (ROM), e.g. a compact disk (CD) ROM, or a microelectronic circuit ROM, or magnetic recording means, such as a hard disk, or indeed a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to manage the operation of a registration server of the invention.

Although the present disclosure has been described with reference to one or more examples, workers skilled in the art will recognize that changes may be made in form and detail without departing from the scope of the disclosure and/or the appended claims.

The invention claimed is:

1. A registration server in an IP network, the server comprising:
 a non-transitory computer-readable medium comprising instructions stored thereon; and
 a processor configured by the instructions to perform acts comprising:
 acting, after receiving a request for an initial registration or for refreshing a registration with said IP network, or for an initial subscription or for refreshing a subscription to a given service made available on the IP network, to select for a client device sending the request a value for a corresponding refresh period; and
 selecting said value as a function, at least, of a type of authentication used by said client device for authenticating itself with the IP network.

2. A registration server according to claim 1, the processor being configured further to act, when performing said selection of the value for the refresh period concerning the registration or the subscription to a given service, to take account also of a type of access used by said client device for accessing said IP network.

3. A registration server according to claim 1, wherein said IP network is an IMS type network and said registration server comprises an S-CSCF server.

4. A database comprising:
 a non-transitory computer-readable medium comprising instructions stored thereon; and
 a processor configured by the instructions to perform acts comprising:
 acting in response to a request from a registration server of an IP network to provide to said registration server at least one value for a refresh period for the registration of a client device with said IP network and/or for a subscription by a client device to a given service made available by said IP network; and
 providing the value, when said request specifies a type of authentication used by said client device for authenticating itself with said IP network, depending at least on said authentication type specified in the request.

5. A database according to claim 4, wherein said value also depends on a type of access used by said client device for accessing said IP network, said access type also being specified in said request.

6. A selection method for selecting a refresh period in an IP network, the method comprising:
 a client device sending a request for an initial registration or for refreshing registration on said IP network or for an initial subscription or for refreshing a subscription to a given service available on the IP network; and
 said client device receiving, in response to its request, a value for the corresponding refresh period;
 wherein said value is a function, at least, of a type of authentication used by said client device for authenticating itself with the IP network.

7. A selection method according to claim 6, wherein said value is also a function of a type of access used by said client device for accessing said IP network.

8. A non-transitory computer-readable data storage medium comprising a computer program stored thereon, the program comprising instructions for managing operation of a registration server, when executed on a computer, wherein the instructions configure the registration server to perform the following acts:
 acting, after receiving a request for an initial registration or for refreshing a registration with said IP network, or for an initial subscription or for refreshing a subscription to a given service made available on the IP network, to select for the client device sending the request a value for a corresponding refresh period; and
 selecting said value as a function, at least, of a type of authentication used by said client device for authenticating itself with the IP network.

* * * * *